US009369383B2

(12) United States Patent
Duda et al.

(10) Patent No.: US 9,369,383 B2
(45) Date of Patent: Jun. 14, 2016

(54) METHOD AND SYSTEM FOR OVERLAY ROUTING WITH VXLAN

(71) Applicants: Kenneth James Duda, Santa Clara, CA (US); Adam James Sweeney, Santa Clara, CA (US)

(72) Inventors: Kenneth James Duda, Santa Clara, CA (US); Adam James Sweeney, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/321,335

(22) Filed: Jul. 1, 2014

(65) Prior Publication Data

US 2015/0010001 A1 Jan. 8, 2015

Related U.S. Application Data

(60) Provisional application No. 61/842,132, filed on Jul. 2, 2013, provisional application No. 61/846,259, filed on Jul. 15, 2013.

(51) Int. Cl.
*H04L 12/46* (2006.01)
*H04L 12/741* (2013.01)
*H04L 12/721* (2013.01)
*H04L 12/931* (2013.01)

(52) U.S. Cl.
CPC ............ *H04L 45/74* (2013.01); *H04L 12/4641* (2013.01); *H04L 45/66* (2013.01); *H04L 45/745* (2013.01); *H04L 49/70* (2013.01)

(58) Field of Classification Search
None
See application file for complete search history.

(56) References Cited

U.S. PATENT DOCUMENTS

| 8,296,459 B1 | 10/2012 | Brandwine et al. |
| 2012/0254353 A1 * | 10/2012 | Baba .................. H04L 12/4633 709/217 |
| 2012/0287936 A1 | 11/2012 | Biswas et al. |
| 2013/0124750 A1 | 5/2013 | Anumala et al. |

OTHER PUBLICATIONS

M. Mahalingam et al., "VXLAN: A Framework for Overlaying Virtualized Layer 2 Networks over Layer 3 Networks", Apr. 10, 2014, pp. 1-23.*
International Search Report issued in PCT/US2014/045183 mailed Oct. 29, 2014 (5 pages).
Written Opinion issued in PCT/US2014/045183 mailed Oct. 29, 2014 (8 pages).
Mahalingam, M., et al., "VXLAN: A Framework for Overlaying Virtualized Layer 2 Networks over Layer 3 Networks", Internet Engineering Task Force, Aug. 10, 2014, 23 pages.

* cited by examiner

*Primary Examiner* — Adnan Baig
(74) *Attorney, Agent, or Firm* — Osha · Liang LLP

(57) ABSTRACT

In general, embodiments of the invention relate to routing packets between hosts or virtual machines in different layer 2 domains. More specifically, embodiments of the invention relate to using overlay routing mechanisms in an Internet Protocol (IP) fabric to enable communication between hosts or virtual machines in different layer 2 domains to communication. The overlay routing mechanisms may include direct routing, indirect routing, naked routing, or a combination thereof (e.g., hybrid routing).

20 Claims, 11 Drawing Sheets

METHOD AND SYSTEM FOR OVERLAY ROUTING WITH VXLAN

CROSS-REFERENCE TO RELATED APPLICATIONS

Pursuant to 35 U.S.C. §119(e), this application claims benefit of U.S. Provisional Application No. 61/842,132 filed on Jul. 2, 2013, entitled "METHOD AND SYSTEM FOR OVERLAY ROUTING WITH VXLAN." The disclosure of the U.S. Provisional Application is incorporated herein by reference in its entirety.

Pursuant to 35 U.S.C. §119(e), this application claims benefit of U.S. Provisional Application No. 61/846,259 filed on Jul. 15, 2013, entitled "METHOD AND SYSTEM FOR TOP OF RACK SWITCH ROUTING WITH VXLAN AND NSX." The disclosure of the U.S. Provisional Application is incorporated herein by reference in its entirety.

BACKGROUND

Data centers typically include multiple hosts where the hosts, in turn, each execute multiple virtual machines. The virtual machines may belong to virtual layer 2 segments that span across a physical layer-3 data center network using an overlay technology. Traditionally, when using an overlay technology, virtual machines in different layer 2 segments are unable to communicate.

SUMMARY

In general, in one aspect, the invention relates to a method for routing. The method includes receiving, by a first Top of Rack (ToR) switch, a first VXLAN frame comprising a first server media access control (MAC) address, a first ToR switch MAC address, a first server Internet Protocol (IP) address, a VARP VTEP IP address, a first VNI, and a MAC frame, wherein the MAC frame comprises a VARP MAC address, a first virtual machine (VM) IP address associated with a first VM, and a second VM IP address associated with a second VM, wherein the first VM is executing on the first server, decapsulating, by the first ToR switch, the first VXLAN frame to obtain the MAC frame, processing, on the first ToR switch, the MAC frame to obtain a rewritten MAC frame, wherein the rewritten MAC frame comprises a second VM MAC address associated with the second VM and the VARP MAC address, generating, by the first ToR switch, a second VXLAN frame comprising the first ToR Switch MAC address, a next hop MAC address, a VARP VTEP IP address, a second server IP address, a second VNI, and the rewritten MAC frame, wherein the second server IP address is associated with a second server, and wherein the second VM executes on the second server, wherein the first VM does not execute on the second server, and routing the second VXLAN frame through an IP fabric to the second server, wherein the IP Fabric comprises a spine tier comprising a spine switch and a leaf tier comprising the first ToR switch, and a second ToR switch and wherein the second server is connected to the second ToR switch.

In general, in one aspect, the invention relates to a method for routing. The method includes receiving, by a first Top of Rack (ToR) switch, a first VXLAN frame comprising a first media access control (MAC) address, a first ToR switch MAC address, a first server Internet Protocol (IP) address, a first VARP VTEP IP address, a first VNI, and a MAC frame, wherein the MAC frame comprises a first VARP MAC address, a first virtual machine (VM) IP address associated with the first VM, and a second VM IP address associated with a second VM, decapsulating, by the first ToR switch, the first VXLAN frame to obtain the MAC frame, processing, on the first ToR switch, the MAC frame to obtain a rewritten MAC frame, wherein the rewritten MAC frame comprises the first ToR switch MAC address and a second MAC address associated with a second ToR switch, generating, by the first ToR switch, a second VXLAN frame comprising the first ToR switch MAC address, a first next hop MAC address, a first ToR switch IP address, a second ToR IP address, a second VNI, and the rewritten MAC frame, routing the second VXLAN frame through an IP fabric to the second ToR switch, wherein the IP Fabric comprises a spine switch, the first ToR switch, and the second ToR switch, receiving, by the second ToR switch, the second VXLAN frame, decapsulating, by the second ToR switch, the second VXLAN frame to obtain the rewritten MAC frame, processing, on the second ToR switch, the rewritten MAC frame to obtain a second rewritten MAC frame, wherein the second rewritten MAC frame comprises a second VM MAC address and a second VARP MAC address, generating, by the second ToR switch, a third VXLAN frame comprising a second ToR switch MAC address, a second next hop MAC address, a second VARP VTEP IP address, a second server IP address, a third VNI, and the second rewritten MAC frame, wherein the second server IP address is associated with the second server, and wherein the second VM does not execute on the second server, and routing the third VXLAN frame through the IP fabric to the second server.

In general, in one aspect, the invention relates to a method for routing. The method includes receiving, by a first Top of Rack (ToR) switch, a first VXLAN frame comprising a first server media access control (MAC) address, a first ToR switch MAC address, a first server Internet Protocol (IP) address, a first VARP VTEP IP address, a first VNI, and a first MAC frame, wherein the first MAC frame comprises a first VARP MAC address, and an inner IP header, wherein the inner header comprises a first virtual machine (VM) IP address associated with the first VM, and a second VM IP address associated with a second VM, decapsulating, by the first ToR switch, the first VXLAN frame to obtain the MAC frame, processing, on the first ToR switch, the MAC frame to obtain a second MAC frame, wherein the second MAC frame comprises a second MAC address associated with a second ToR switch and the first ToR switch MAC address, routing the second MAC frame to the second ToR switch via a spine tier, wherein the second MAC frame is not transmitted using a VXLAN protocol, receiving, by the second ToR switch from the spine tier, a third MAC frame comprising the inner IP header, processing, on the second ToR switch, the third MAC frame to obtain a fourth MAC frame, wherein the fourth MAC frame comprises a second VM MAC address and a second VARP MAC address, generating, by the second ToR switch, a second VXLAN frame comprising the second MAC address, a second next hop MAC address, a second VARP VTEP IP address, a second server IP address, a second VNI, and the second rewritten MAC frame, wherein the second server IP address is associated with a second server and wherein the second VM executes on second server, wherein the first VM does not execute on the second server, and routing the second VXLAN frame through a IP fabric towards the second server, wherein the IP fabric comprises the spine tier, the first ToR, and the second ToR switch.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to routing packets between hosts or virtual machines in different layer 2 domains. More specifically, embodiments of the invention relate to using overlay routing mechanisms in an Internet Protocol (IP) fabric to enable communication between hosts or virtual machines in different layer 2 domains to communication. The overlay routing mechanisms may include direct routing (see e.g., FIGS. 4 and 5A-5E), indirect routing (see e.g., FIGS. 6 and 7), naked routing (see e.g., FIGS. 8 and 9), or a combination thereof (e.g., hybrid routing).

In one embodiment of the invention, the overlay routing mechanisms use, at least in part, the VXLAN protocol. One version of the VXLAN protocol is defined in the document entitled "VXLAN: A Framework for Overlaying Virtualized Layer 2 Networks over Layer 3 Networks" version 09 dated April 2014. The VXLAN protocol is hereby incorporated by reference in its entirety. The invention is not limited to a particular version of VXLAN.

Figure 2:
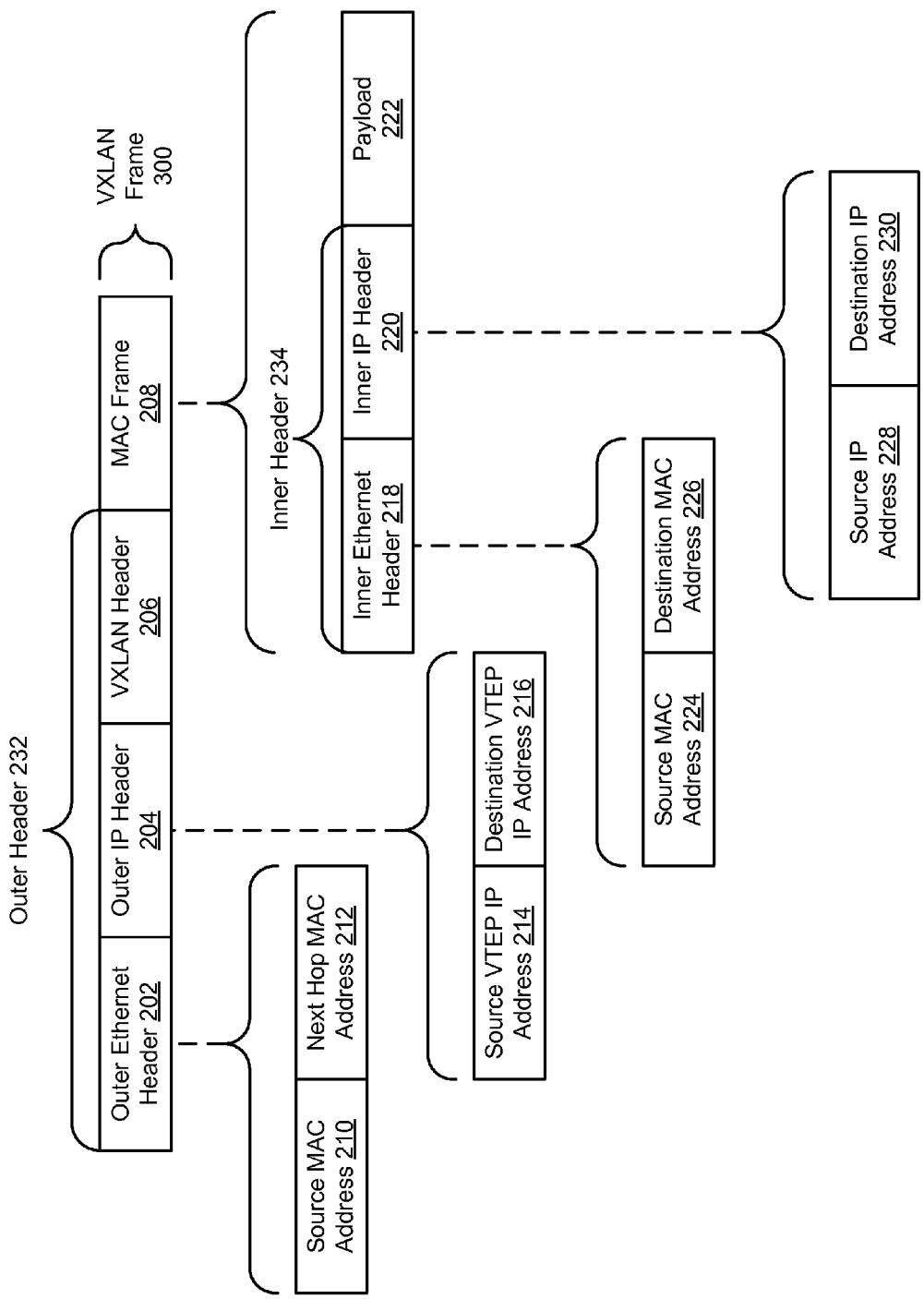
FIG. 2 shows a VXLAN frame in accordance with one or more embodiments of the invention.

In one embodiment of the invention, a layer 2 domain is defined as the set of virtual machines and/or hosts (also referred to as servers) that communicate using the same virtual network identifier (VNI), where the VNI is defined by the VXLAN protocol (see e.g., FIG. 2). The VNI scopes the MAC frame originated by the virtual machine (or host) such that the MAC frame may only be received by destinations (hosts or virtual machines) associated with the same VNI.

In the following description all references to specific MAC addresses, e.g., ToR switch MAC, refer to a MAC address associated with a specific component in system, e.g., a virtual machine, a server, a ToR Switch, a Spine switch, etc. but should not be interpreted to mean that such component only has one such MAC address. Rather, in various embodiments of the invention, one or more of the aforementioned components may be associated with multiple MAC addresses.

In the following description all references to specific IP addresses, e.g., SS IP address, refer to a MAC address associated with a specific component in system, e.g., a virtual machine, a server, a ToR Switch, a Spine switch, etc. but should not be interpreted to mean that such component only has one such IP address. Rather, in various embodiments of the invention, one or more of the aforementioned components may be associated with multiple IP addresses.

Figure 1:
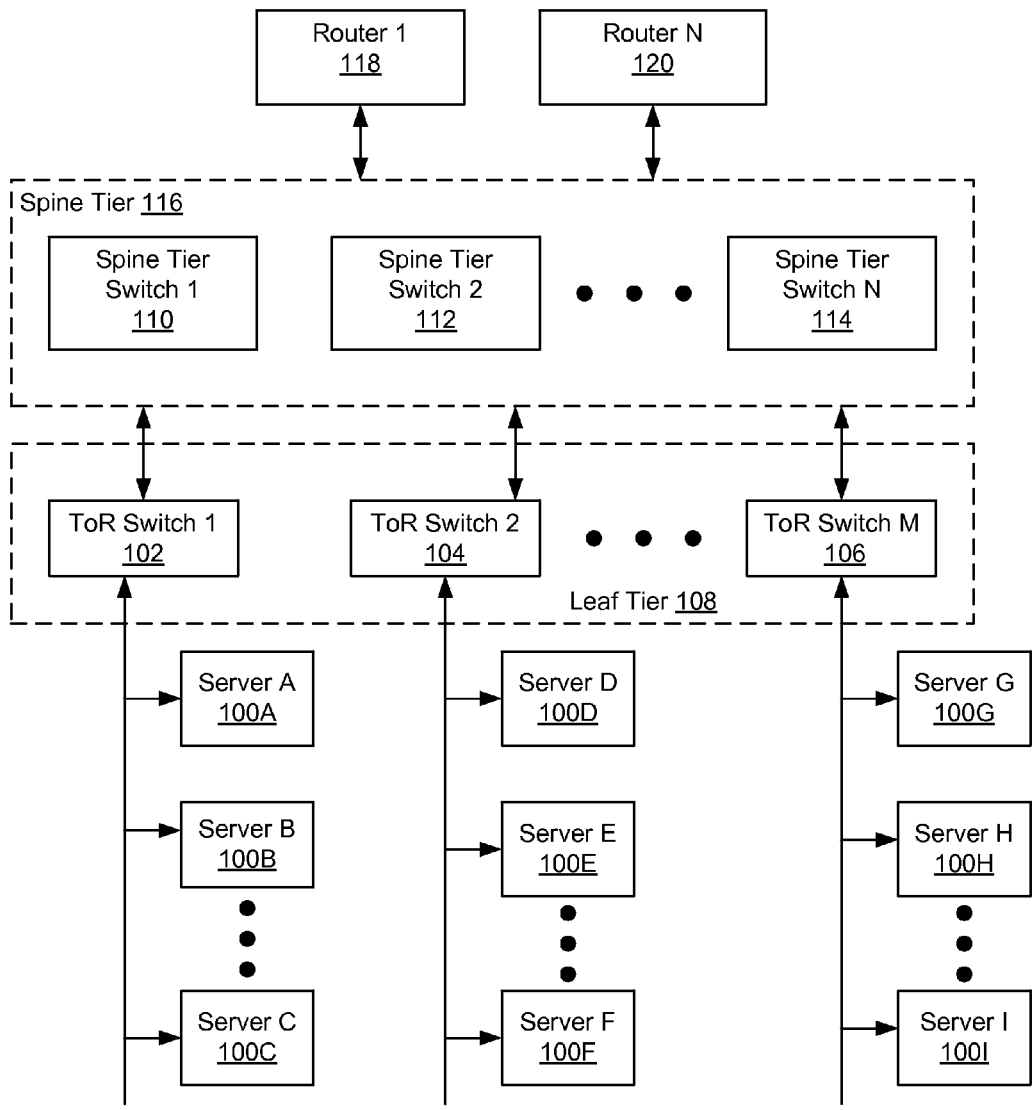
FIG. 1 shows a system in accordance with one or more embodiments of the invention.

FIG. 1 shows a system in accordance with one or more embodiments of the invention. The system includes one or more servers (100A-100I), a leaf tier (108), a spine tier (116), and one or more routers (118, 120). The leaf tier and the spine tier may be collectively referred to as the IP Fabric. Further, all of the aforementioned components may be co-located in the same physical location. Alternatively, the aforementioned components may not all be co-located. Additional details regarding each of the aforementioned components are provided below.

In one embodiment of the invention, a server (also referred to as a host) (100A-100I) is a computer system. A computer system may include any type of physical system that is configured to generate, send, receive, and/or process MAC frames (see e.g., FIG. 4-9). In addition, each of the servers may include or be configured to execute one or more virtual tunnel end points (VTEP) VTEPs (see FIG. 3). The computer system may also include functionality to execute one or more virtual machines, where each virtual machine may be configured to generate, send, receive, and/or process MAC frames. In one embodiment of the invention, each virtual machine corresponds to an execution environment that is distinct from the execution environment provided by the server upon which it is executing. Examples of virtual machines include, but are not limited to, Oracle® VM and VMware® Virtual Server. (Oracle is a registered trademark of Oracle International Corporation and VMware is a registered trademark of VMware, Inc.). The computer system may include a processor, memory, and one or more physical network interfaces.

Each server is directly connected to at least one Top of Rack (ToR) switch (102, 104, 106) in the leaf tier (108). In one embodiment of the invention, each server is only directly connected to a single ToR switch in the leaf tier (108). In one embodiment of the invention, the ToR switches in leaf tier (108) are not directly connected to each other. Alternatively, if the ToR switches implement Multichassis Link Aggregation (MLAG), then a given ToR switch may be directly connected to one other ToR switch in the leaf tier and a given server may be connected to each of the ToR switches in the MLAG domain. Each of the ToR switches may include or be configured to execute one or more virtual tunnel end points (VTEP) VTEPs (see FIG. 3).

Each ToR switch in the leaf tier (108) is connected to at least one spine switch (110, 112, 114) in the spine tier (116). In one embodiment of the invention, each ToR switch is connected to every other switch in the spine tier. Further, in one embodiment of the invention, the spine switches in the spine tier (116) are not directly connected to each other. Alternatively, if the spine switches implement Multichassis Link Aggregation (MLAG), then a given spine switch may be directly connected to one other spine switch in the spine tier.

In one embodiment of the invention, each leaf switch and each spine switch is a physical device that includes persistent storage, memory (e.g., Random Access Memory), one or more processors, and two or more physical ports. Each port may be connected to either: (i) a computer system (described above), or (ii) a network device (i.e., any device that is part of the network infrastructure such as a leaf switch, a spine switch or a router). Each switch (leaf switch and spine switch) is configured to receive VXLAN frames and/or MAC frames via the ports and determine whether to process the VXLAN and/or MAC frames in accordance with the methods described below in FIGS. 4, 6, and 8.

Figure 3:
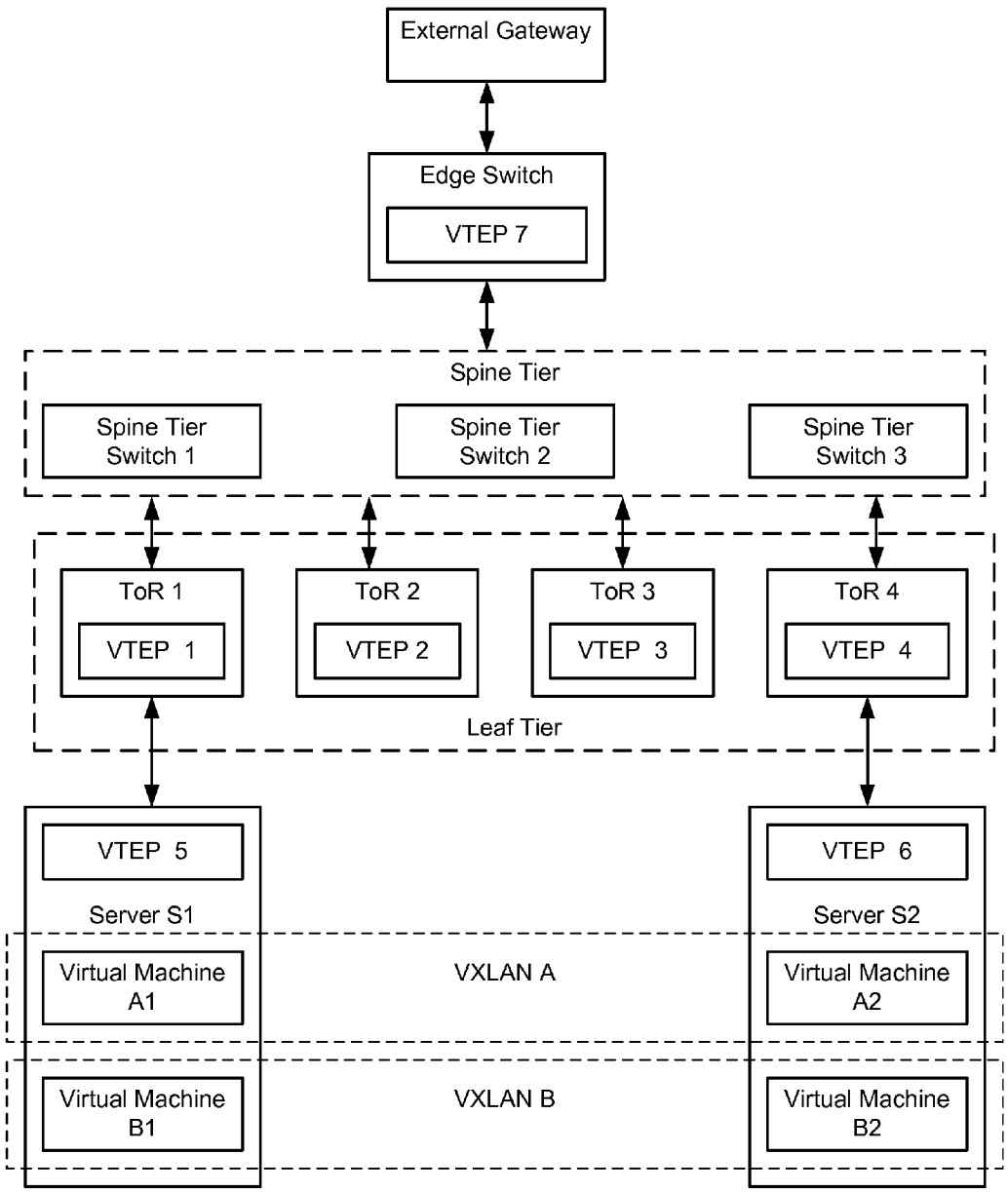
FIG. 3 shows an exemplary system in accordance with one or more embodiments of the invention.

Continuing discussion of FIG. 1, the spine switches may be directly connected to one or more routers (118, 120) or may be indirectly connected to one or more routers (see FIG. 3). In the latter scenario, the spine switches may be connected to one or more edge switches (not shown in FIG. 1) that, in turn, are directly connected to one or more routers (118, 120).

In one embodiment of the invention, the routers (118, 120) are configured to receive MAC frames from other networks (e.g., the Internet) and route the MAC frames towards the appropriate server (100A-100I). In one embodiment of the invention, each router includes a number of physical ports (hereafter ports) and is configured to receive MAC frames via the ports and determine whether to (i) drop the MAC frame, or (ii) send the MAC frame out over another one of the ports on the switch. The router uses the destination internet protocol (IP) address in the received MAC frame along with a routing table to determine out of which port to send the MAC frame.

FIG. 2 shows a VXLAN frame in accordance with one or more embodiments of the invention. The VXLAN frame (200) includes: (i) a MAC frame (208), (ii) a VXLAN header (206), (iii) an outer IP header (204), and (iv) an outer Ethernet header (202). Each of the aforementioned components is described below.

In one embodiment of the invention, the MAC frame (210) is generated by a source host or virtual machine and may include an inner header (234) and a payload (222). The payload (222) may include the content that the source host or virtual machine is attempting to transmit to the destination host or virtual machine. The inner header (234) includes an inner Ethernet header (218) and an inner IP header (220). The inner Ethernet header (218) includes a source MAC address (224), a destination MAC address (226). The inner IP header (220) includes a source IP address (228) and a destination IP address (230). The MAC frame may include other information/content without departing from the invention.

In one embodiment of the invention, the VXLAN header (206) may include, but is not limited to, a virtual network identifier (VNI). The VNI scopes the MAC frame (208) originated by the host or virtual machine such that the MAC frame (208) may only be received by destination servers or virtual machines associated (via a VTEP) with the same VNI. The VXLAN header may include other information/content without departing from the invention.

In one embodiment of the invention, the outer Ethernet header (202) and the outer IP header (204) are used to route the VXLAN frame from the source VTEP to the destination VTEP. To this end, the outer Ethernet header (302) includes the source MAC address (210) and the next hop MAC address (212) and the outer IP header (204) includes the source VTEP IP address (214) and the destination VTEP IP address (216). The aforementioned mentioned components may include other information/content without departing from the invention. The outer Ethernet header (202), the outer IP header (204), and the VXLAN header (306) may be collectively referred to as an outer header (232).

The VXLAN frame may include other components without departing from the invention.

FIG. 3 shows an exemplary system in accordance with one or more embodiments of the invention. The invention is not limited to the system shown in FIG. 3. Turning to FIG. 3, the system includes two servers (Server S1 and Server S2), where each of the servers includes two virtual machines and a VTEP. Specifically, Server S1 includes virtual machine A1, virtual machine B1, and VTEP 5, and Server S2 includes virtual machine A2, virtual machine B2, and VTEP 6.

In one embodiment of the invention, each server and virtual machine is associated with its own Internet Protocol (IP) address and its own media access control (MAC) address. Further, each VTEP on a server (e.g., S1) is associated with the IP address and MAC address of the server on which it is located. Further, each VTEP includes functionality to generate VXLAN frames and process received VXLAN frames, in accordance with the VXLAN protocol, as described in FIGS. 4A-9. Each VTEP may be implemented as a combination of software and storage (volatile and/or persistent storage). Alternatively, each VTEP may be implemented as a combination of hardware and storage (volatile and/or persistent storage). In another alternative, each VTEP may be implemented as a combination of hardware and software.

In the example shown in FIG. 3, each server is associated with two VXLANs. Specifically, virtual machine A1 and virtual machine A2 are associated with VXLAN A and virtual machine B1 and virtual machine B2 are associated with VXLAN B. VXLAN A and VXLAN B are distinct VXLANs and, as such, are associated with separate VNIs.

Continuing with the discussion of FIG. 3, server S1 is directly connected to ToR switch ToR switch 1 and server S2 is directly connected to ToR switch ToR switch 4. In this example, each server is only connected to a single ToR switch. Each ToR switch (ToR switch 1-ToR switch 4) includes a VTEP (VTEP 1-4). Each of the ToR switches is directly connected to every other spine switch (Spine Switch 1-3) in the spine tier. Each of the spine switches is, in turn, directly connected to an edge switch, where the edge switch includes a VTEP (VTEP 7). Finally, the edge switch is directly connected to a router. In one embodiment of the invention, the each VTEP on a ToR (e.g., ToR switch 1) is associated with the IP address and MAC address of the ToR on which it is located.

The aforementioned system is used below to describe various embodiments of the invention. Specifically, the aforementioned system is used to illustrate the different embodiments of overlay routing. However, the invention is not limited to the system shown in FIG. 3.

Figure 4A:
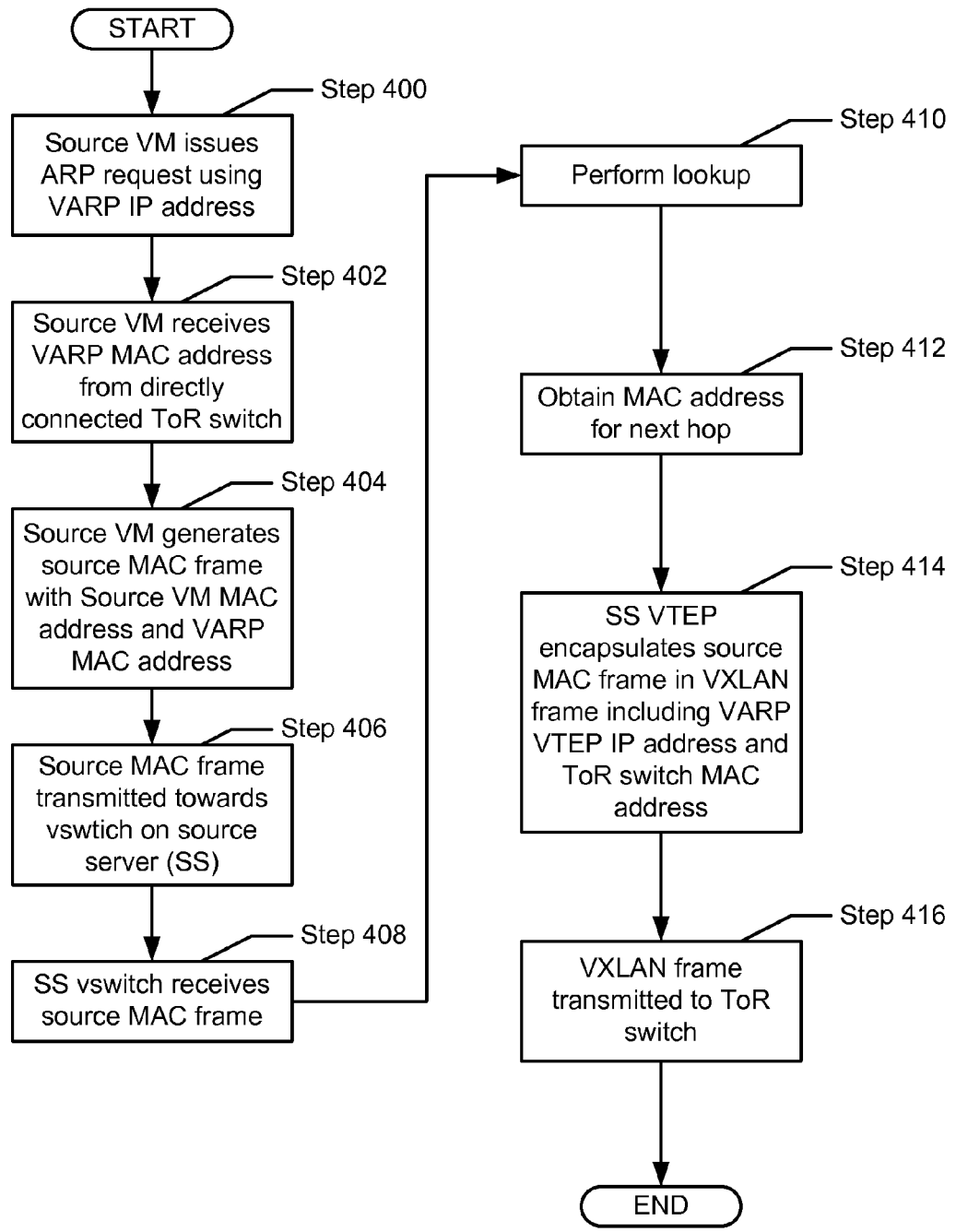
FIG. 4A shows a method for generating a VXLAN frame in accordance with one or more embodiments of the invention.
Figure 4B:
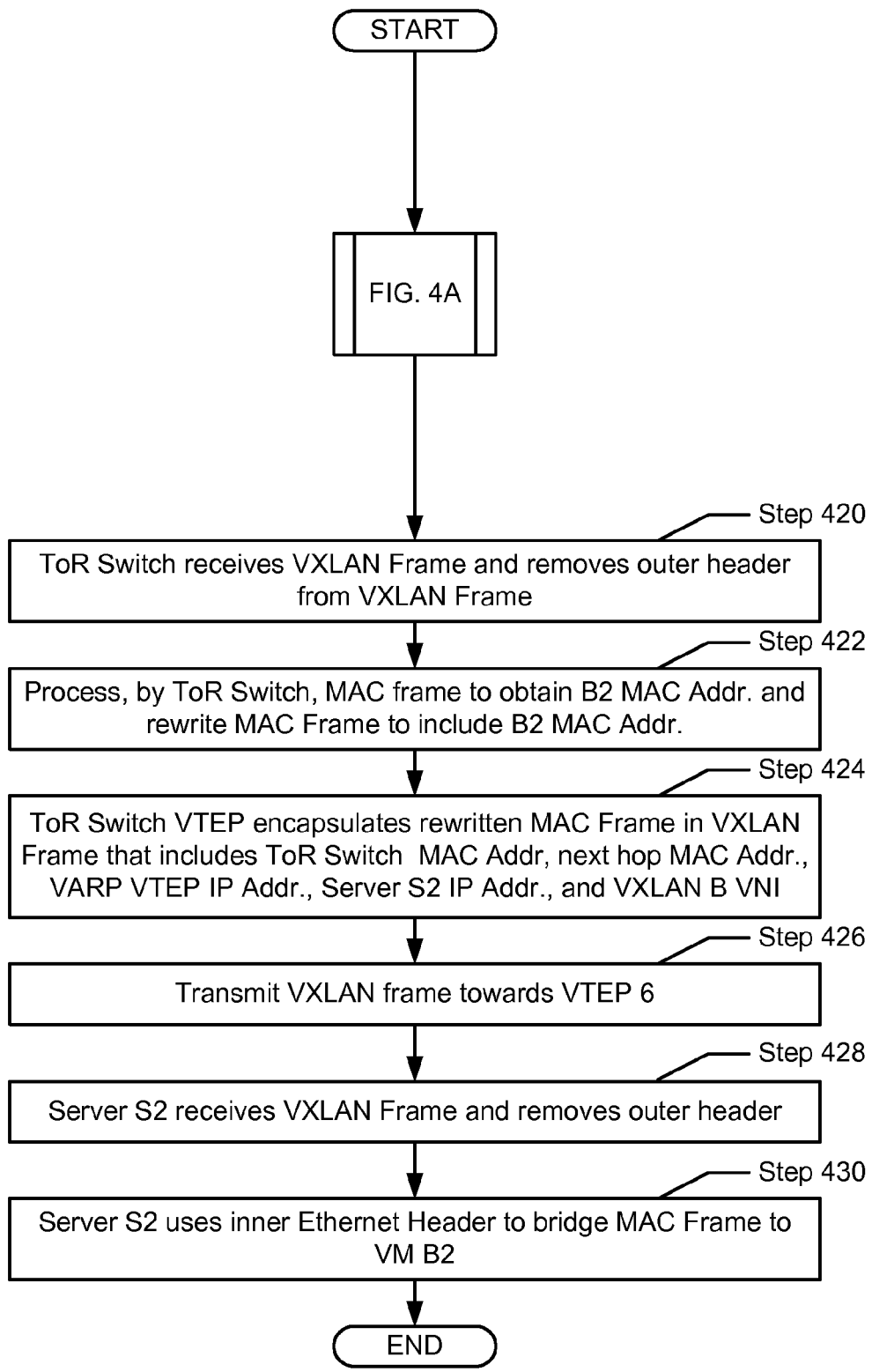
FIG. 4B shows a method for direct overlay routing in accordance with one or more embodiments of the invention.

FIGS. 4A-4B show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4A-4B may be performed in parallel with any other steps shown in FIGS. 6 and 8 without departing from the invention.

Turning to FIGS. 4A and 4B, FIGS. 4A and 4B show a method for direct overlay routing in accordance with one or more embodiments of the invention. The following discussion of direct overlay routing is described in relation to the system in FIG. 3; however, embodiments of the invention are not limited to the system shown in FIG. 3.

The method shown in FIGS. 4A-4B describe direct overlay routing to enable virtual machine A1 (hereafter referred to as a source VM) in VXLAN A to communicate with virtual machine B2 (hereafter referred to as a destination VM) on VXLAN B. From the perspective of virtual machine A1, virtual machine A1 is not aware of the VXLAN protocol or of any overlay routing mechanisms; rather, virtual machine A1 operates as if it can communicate directly with virtual machine B2 using conventional routing mechanisms.

In step 400, the source VM issues an ARP request using the VARP IP address that is associated with VXLAN A. Prior to issuing the ARP request in step 400, the VARP IP address is set as the default gateway address for the overlay network. A ToR switch implementing one or more embodiments of the invention (e.g., a ToR Switch in the leaf tier (as discussed above)), receives the ARP request and subsequently generates an ARP response that includes the VARP MAC address. In one embodiment of the invention, the ToR switch that sent the ARP response is the ToR Switch that is directly connected to the source server upon which the source VM is executing.

In one embodiment of the invention, each ToR switch includes a VARP IP address configured on each switch virtual interface (SVI) for every layer 2 domain with which the ToR switch is associated. For example, if the ToR switch is associated with VXLAN A and VXLAN B, then the VARP IP address assigned to the SVI for VXLAN A may be 192.168.1.1 and VARP IP address assigned to the SVI for VXLAN B may be 192.168.2.1. Each ToR Switch includes a VARP IP address to VARP MAC address mapping, such that when an Address Resolution Protocol (ARP) request includes any VARP IP address, the VARP MAC address is returned in the ARP response. There may be one VARP MAC address for each layer 2 domain.

In one embodiment of the invention, the VARP MAC address corresponds to the MAC address that hosts (or virtual machines) use to send MAC frames that require routing. Accordingly, when a TOR switch receives a MAC frame that includes a VARP MAC address as the destination address, the ToR Switch removes the Ethernet header from the MAC frame and determines the next hop for the IP packet (i.e., IP header and payload).

In Step 402, the source VM receives the VARP MAC address (via the ARP response). In Step 404, the source VM generates a source MAC frame that includes, at least, (i) the source VM MAC address as the source MAC address, (ii) the VARP MAC address as the destination MAC address, (iii) VM A1 IP address as the source IP address, and (iv) VM B2 IP address as the destination IP address. In Step 406, the source MAC frame (generated in Step 404) is transmitted towards a virtual switch (also referred to as vswitch) and/or hypervisor on the source server.

In Step 408, the source server's vswitch receives the aforementioned source MAC frame. The source server is the server upon which the source VM is executing. Further, the source server is executing a VTEP (e.g., in a hypervisor). The source server may also be executing a virtual switch (vswitch). In step 410, a lookup is performed in the vswtich MAC table using the VARP MAC address. The result of the lookup is identification of a VXLAN binding that indicates the VTEP corresponding to the VARP MAC address is the VTEP associated with a VARP VTEP IP address. A second lookup is then performed using the source server's physical IP routing table. The result of the second lookup is a determination that the VARP VTEP IP address matches the default route in the physical IP routing table. The default route indicates that the next hop for the VXLAN frame is the ToR Switch directly connected to the SS. More specifically, the default route includes the IP address of the ToR Switch. In Step 412, the MAC address for the ToR Switch (identified in Step 410) is determined. More specifically, a determination is made that the source server's network interface card is configured with a subnet that includes an IP address of the ToR Switch. The IP address of the ToR switch is used to obtain the MAC address of the ToR Switch. The MAC address of the ToR Switch may be determined using, for example, ARP, if the MAC address is not already present in an ARP table on the source server.

In step 414, the SS VTEP encapsulates the source MAC frame within a VXLAN frame (see e.g., FIG. 2). More specifically, the VXLAN frame includes an outer header with the following information: a MAC address of the source server (as the source MAC address), a MAC address of the ToR Switch (as the destination MAC address) (i.e., the MAC address obtained in Step 412), an IP address of the SS (as the source IP address), the VARP VTEP IP address (as the destination IP address), and VNI A (i.e., the VNI associated with VXLAN A). In step 416, the SS transmits the VXLAN frame to the ToR switch that is directly connected to the SS.

Referring to FIG. 4B, in step 420, the VTEP on the ToR Switch receives the VXLAN frame and removes the outer header (see e.g., 232 in FIG. 2) to obtain the MAC frame. In one embodiment of the invention, the received VXLAN frame is trapped and decapsulated because the VXLAN frame includes the ToR switch MAC address as the destination MAC address in the outer Ethernet header and includes the VARP VTEP IP address as the destination IP address in the outer IP header. In step 422, the ToR Switch processes the MAC frame in order to obtain a rewritten MAC frame. More specifically, in one embodiment of the invention, the ToR Switch performs a routing function using the VM B2 IP address in order to determine that the ToR switch is directly connected (from an IP point of view) to VM B2. In one embodiment of the invention, ToR switch routes the MAC frame as it is operating as a default gateway. Based on this determination, the VM B2 MAC address is obtained. In one embodiment of the invention, ARP may be used to obtain the VM B2 MAC address. In one embodiment of the invention, the ToR switch includes a routing table entry for each subnet that includes servers connected to the leaf tier and for each subnet that includes virtual machines, (see e.g., FIG. 3). In one embodiment of the invention, the ToR switch includes two routing tables: one for the overlay network, and one for the underlay network. The underlay routing table includes a route for each subnet of servers or other equipment attached to the leaf tier, and one or more routes (possibly including a default route) pointing towards external network elements. The overlay routing table includes information about the IP segments carried by each layer 2 domain. In another embodiment, there is only one routing table that includes both underlay network and overlay network routes. In another embodiment, there is one underlay routing table and a number of overlay routing tables (e.g., one overlay routing table per routing domain, which possibly correspond to different tenants in a multi-tenant data center).

Continuing with the discussion of FIG. 4B, in the instant example, the inner MAC frame received in the VXLAN frame in step 420 is rewritten to remove the ToR Switch MAC address as the destination MAC address and to replace it with the VM B2 MAC address. Further, the source MAC address in the inner MAC frame may be replaced with VARP MAC address. (See e.g., FIG. 5D).

Continuing with the discussion of FIG. 4B, in step 424, the VTEP on the ToR Switch encapsulates the rewritten MAC frame (obtained in step 422) in a VXLAN frame. More specifically, the VXLAN frame includes an outer header with the following information: ToR switch MAC address (as the source MAC address), a MAC address of next hop (as the destination MAC address), a VARP VTEP IP address (as the source IP address), an IP address of server S2 (as the destination IP address), and VNI B (i.e., the VNI associated with VXLAN B). The destination IP address in the outer header corresponds to a destination server (i.e., server S2) that includes the VTEP that will decapsulate the VXLAN frame generated in step 424. The destination IP address may be determined using the VM B2 IP address. Finally, VNI B is included in the VXLAN frame because VM B2 is associated with VNI B and, as such, VNI B is required to be included for VM B2 to ultimately receive the MAC frame generated in step 422.

Continuing with the discussion on FIG. 4B, in step 426, the VXLAN frame generated in step 416, is transmitted, via the IP Fabric, to the VTEP on server S2. The VXLAN frame is transmitted in accordance with standard IP routing mechanisms through the IP fabric until it reach server S2. In this example, the VXLAN frame may be transmitted to spine switch 2 and spine switch 2 may subsequently transmit the VXLAN frame to ToR switch 4. Upon receipt of the VXLAN frame, ToR switch 4 may subsequently transmit the VXLAN frame to server S2. Those skilled in the art will appreciate the outer Ethernet header of the VXLAN frame is rewritten at each hop in the IP fabric until it reaches server S2.

In step 428, the VTEP on the server S2 receives the VXLAN frame from ToR switch 4 and removes the outer header (see e.g., 232 in FIG. 2) to obtain the MAC frame (generated in Step 408). In step 430, the VTEP on Server S2 bridges (i.e., sends using the destination MAC address in the MAC frame) the MAC frame to virtual machine B2. VM B2 subsequently processes the MAC frame and extracts the payload.

Figure 5A:
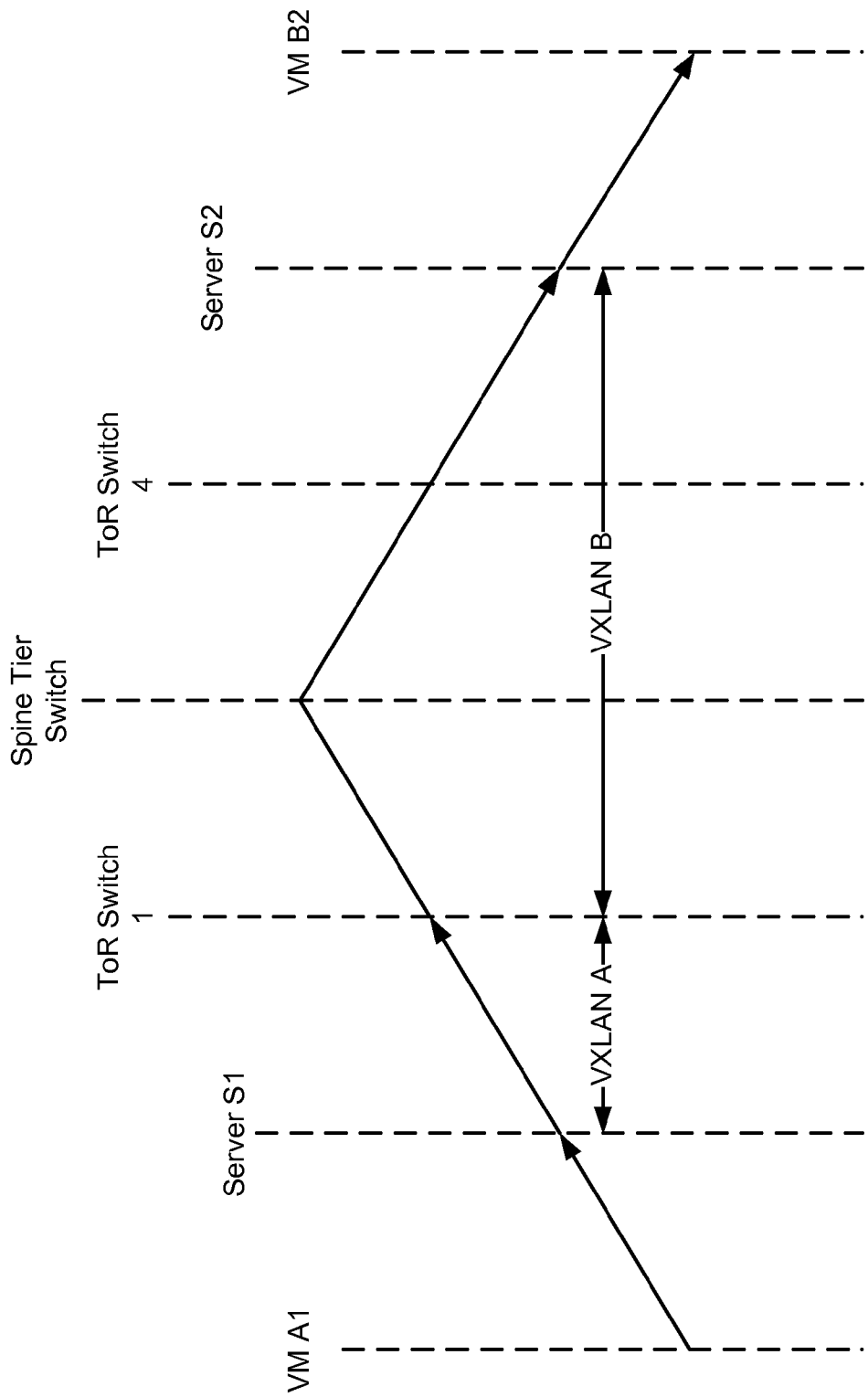
FIG. 5A shows an exemplary path of a payload transmitted using direct overlay routing in accordance with one or more embodiments of the invention.
Figure 5B:
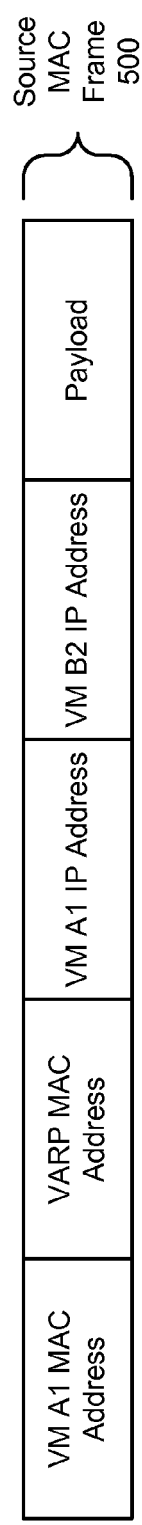
FIG. 5B shows an exemplary MAC frame in accordance with one or more embodiments of the invention.
Figure 5C:
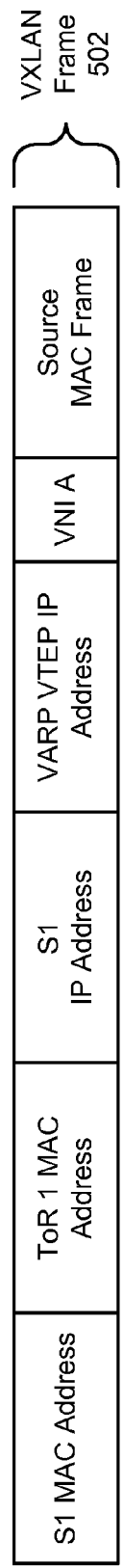
FIG. 5C shows an exemplary VXLAN frame in accordance with one or more embodiments of the invention.
Figure 5D:
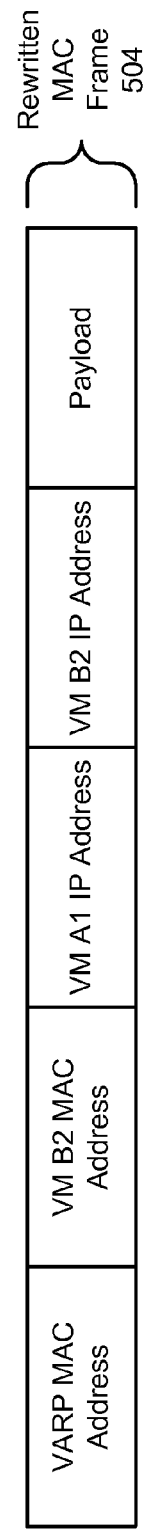
FIG. 5D shows an exemplary MAC frame in accordance with one or more embodiments of the invention.
Figure 5E:
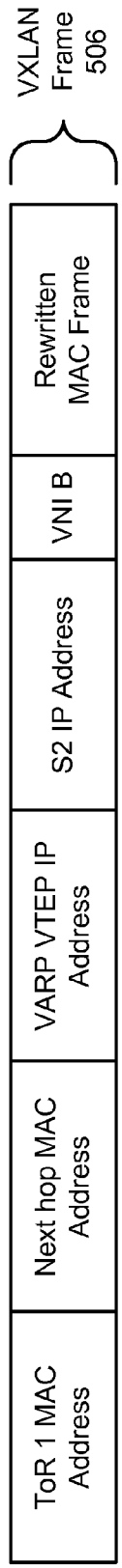
FIG. 5E shows an exemplary VXLAN frame in accordance with one or more embodiments of the invention.

FIG. 5A shows an exemplary path of a payload transmitted using direct overlay routing in accordance with one or more embodiments of the invention. More specifically, FIG. 5A shows an exemplary path the payload from VM A1 may take to reach VM B2. The exemplary path tracks the path described in FIGS. 4A-4B. The components shown in FIG. 5A correspond to like named components in FIG. 3 and FIGS. 4A-4B. Turning to FIG. 5A, when the initial VXLAN frame (which encapsulated the initial MAC frame including the payload) is transmitted by server S1 to ToR switch 1 switch, the VXLAN frame is transmitted on VXLAN A. The initial VXLAN frame is generated in accordance with FIG. 4A. FIG. 5B shows a source MAC frame (500) generated in accordance with FIG. 4A and FIG. 5C shows a VXLAN frame (502) generated in accordance with FIG. 4A. Continuing with the discussion of FIG. 5A, at ToR switch 1 switch, after the routing of the MAC frame (see Step 422 in FIG. 4B), the new resulting MAC frame (see FIG. 5D, 504) is encapsulated into a new VXLAN frame (see FIG. 5E, 506) and transmitted towards server S2. The new VXLAN frame is transmitted on VXLAN B. Embodiments of the invention enable ToR switch 1 switch to take a MAC frame received via one VXLAN and transmit the MAC frame (a portion of which is rewritten) in via a separate VXLAN. In one embodiment of the invention, this functionality is achieved by first routing the MAC frame and then generating and IP forwarding the VXLAN frame.

Figure 6:
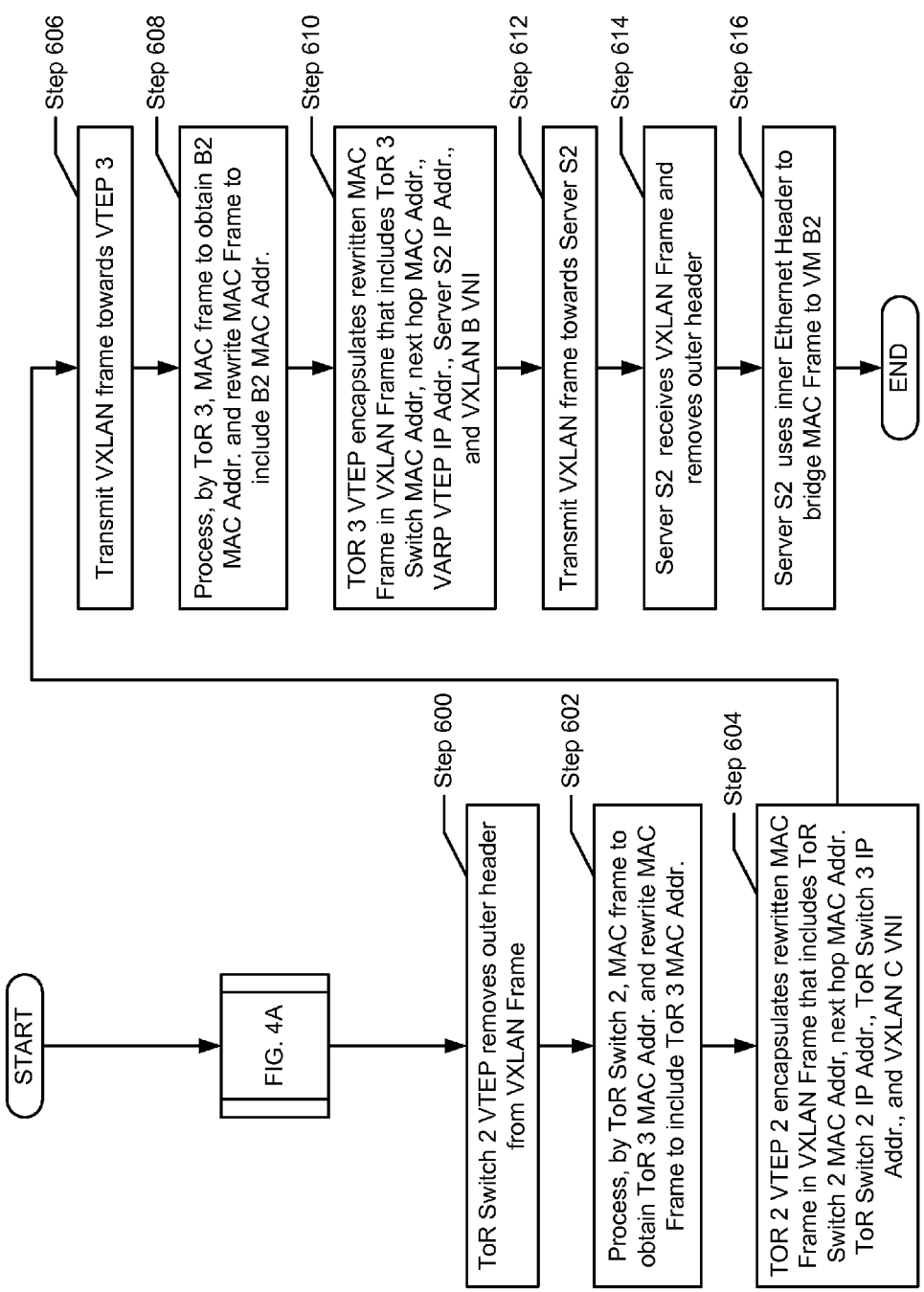
FIG. 6 shows a method for indirect overlay routing in accordance with one or more embodiments of the invention.

FIG. 6 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 6 may be performed in parallel with any other steps shown in FIGS. 4A, 4B and 8 without departing from the invention.

Turning to FIG. 6, FIG. 6 shows a method for indirect overlay routing in accordance with one or more embodiments of the invention. The following discussion of indirect overlay routing is described in relation to the system in FIG. 3; however, embodiments of the invention are not limited to the system shown in FIG. 3.

The method shown in FIG. 6 describes indirect overlay routing to enable virtual machine A1 in VXLAN A to communicate with virtual machine B2 on VXLAN B. From the perspective of virtual machine A1, virtual machine A1 is not aware of the VXLAN protocol or of any overlay routing; rather, virtual machine A1 operates as if it can communicate directly with virtual machine B2 using conventional routing mechanisms.

The generation of the VXLAN frame that is transmitted from the source server to a ToR switch is performed in accordance with FIG. 4A. However, instead of single VARP MAC address and a single VARP VTEP IP address for all ToR switches, there are multiple VARP MAC addresses and VARP VTEP IP addresses, where different VARP MAC addresses and VARP VTEP IP addresses are used for different layer 2 domains. Accordingly, the specific VARP MAC address and VARP VTEP IP address pair that is present in a given VXLAN Frame may vary based upon the layer 2 domain in which source VM and source server are located. Said another way, because different ToR switches route in in and out of different layer 2 domains of VXLAN, it is essential that the VXLAN frames issued by the source server reach the appropriate ToR Switch (i.e., the ToR switch that has the appropriate routing information). This is enabled by using distinct VARP VTEP IP address and VARP MAC address combinations.

Continuing with FIG. 6, in step 600, the VTEP on ToR switch 2 receives the VXLAN frame and removes the outer header (see e.g., 232 in FIG. 2) to obtain the MAC frame. The VXLAN frame received in Step 600 includes a VARP VTEP IP address for VXLAN A (as the outer destination IP address) and a VARP MAC address for VXLAN A (as the inner header destination MAC address). In one embodiment of the invention, the ToR Switch referenced in step 600 receives, traps, and decapsulates the VXLAN frame because the VXLAN frame includes the ToR switch MAC address of the ToR switch as the destination MAC address in the outer Ethernet header and includes the VARP VTEP IP address as the destination IP address in the outer IP header.

In one embodiment of the invention, prior to the generation of the aforementioned MAC frame, VM A1 is configured to use a VARP VTEP IP address as the default gateway, which is implemented on ToR Switch 2 and other ToR Switches thereby providing active-active redundancy. Further, ToR switch 2 is also associated with a specific VARP MAC address, which in combination with the aforementioned VARP VTEP IP address, enables the VXLAN frame transmitted by the source server to reach ToR switch 2.

Continuing with the discussion of FIG. 6, in step 602, the ToR switch 2 processes the MAC frame in order to obtain a rewritten MAC frame. More specifically, in one embodiment of the invention, the ToR switch 2 performs a routing function using the VM B2 IP address in order to determine that ToR switch 2 is directly connected to ToR Switch 3 (from an IP point of view). Based on this determination, the next hop MAC address for the MAC frame is obtained, which in this example is the MAC address of ToR Switch 3.

In one embodiment of the invention, the IP fabric includes a dedicated layer 2 network (with a dedicated VNI) interconnecting all ToR switch routing functions thereby enabling the ToR switches to exchange information (e.g., using interior gateway protocol (IGP)) about which ToR switch provides routes to which overlay subnet(s).

For purposes of this explanation, assume that the routing table in ToR switch 2 includes a route table entry specifying a route to the appropriate ToR switch from which VM B2 may be accessed. Further, assume that the routing table entry indicates that VM B2 is reachable via ToR switch 3. Accordingly, the MAC frame received in the VXLAN frame in step 600 is rewritten to remove the VARP MAC address as the destination MAC address and to replace it with the ToR switch 3 MAC address. Further, the source MAC address ToR Switch 2 MAC address.

Continuing with the discussion of FIG. 6, in step 604, the VTEP on ToR Switch 2 encapsulates the rewritten MAC frame (obtained in step 602) in a VXLAN frame. More specifically, the VXLAN frame includes an outer header with the following information: a MAC address of the ToR Switch 2 (e.g., ToR switch 2 router MAC address) (as the source MAC address), a MAC address of the next hop (e.g., the MAC address Spine Tier Switch 2) (as the destination MAC address), an IP address of ToR switch 2 (as the source IP address) (e.g., ToR switch 2 VTEP IP address), an IP address of ToR switch 3 (as the destination IP address) (e.g., ToR switch 2 VTEP IP address), and VNI C (i.e., the VNI associated with VXLAN C). The destination IP address in the outer header corresponds to ToR that includes the VTEP that will decapsulate the VXLAN frame generated in step 604. The destination VTEP may be determined using the VM B2 IP address. Finally, VNI C is included in the VXLAN frame because ToR switch 3 is associated with VNI C and, as such, VNI C is required to be included for ToR switch 3 to ultimately receive the MAC frame generated in step 604.

Continuing with the discussion on FIG. 6, in step 606, the VXLAN frame generated in step 604 is transmitted, via the IP Fabric to ToR switch 3. The VXLAN frame is forwarded in accordance with standard IP routing mechanisms through the IP fabric until it reaches ToR switch 3. In this example, the VXLAN frame may be transmitted to spine switch 2 and spine switch 2 may subsequently route the VXLAN frame to ToR switch 3. Those skilled in the art will appreciate the outer Ethernet header of the VXLAN frame is rewritten at each hop it traverses in the IP Fabric.

In step 608, the VTEP on ToR switch 3 receives the VXLAN frame from ToR switch 2 and removes the outer header (see e.g., 232 in FIG. 2) to obtain the MAC frame (generated in Step 602). ToR switch 3 subsequently processes the MAC frame in order to obtain a rewritten MAC frame. More specifically, in one embodiment of the invention, ToR switch 3 performs a routing function using the VM B2 IP address in order to obtain the VM B2 MAC address. In one embodiment of the invention, ToR switch 3 includes a routing table, where the routing table includes a routing table entry for VM 2. Accordingly, in the instant example, the MAC frame received in the VXLAN frame in step 608 is rewritten to remove the ToR switch 3 MAC address as the destination MAC address and to replace it with the VM B2 MAC address. Further, the source MAC address in the inner frame is VARP MAC address for VXLAN B.

Continuing with the discussion of FIG. 6, in step 610, the VTEP on ToR switch 3 encapsulates the rewritten MAC frame (obtained in step 608) in a VXLAN frame. More specifically, the VXLAN frame includes an outer header with the following information: a MAC address of ToR switch 3 (as the source MAC address) (e.g., ToR switch 3 router MAC address), a MAC address of the next hop (e.g., Spine Tier Switch 3 (as the destination MAC address), a VARP VTEP IP address for VXLAN B (as the source IP address), an IP address of server S2 (as the destination IP address), and VNI B (i.e., the VNI associated with VXLAN B). The destination IP address in the outer header corresponds to server S2, which includes the VTEP that will decapsulate the VXLAN frame generated in step 610. The destination VTEP may be determined using the VM B2 IP address. Finally, VNI B is included in the VXLAN frame because VM B2 is associated with VNI B and, as such, VNI B is required to be included for VM B2 to ultimately receive the MAC frame generated in step 610. In one embodiment of the invention, the ToR switch 3 MAC address may be used in place of the VARP MAC address and the ToR switch 3 IP address may be used in place of the VARP VTEP IP address.

Continuing with the discussion on FIG. 6, in step 612, the VXLAN frame generated in step 610, is transmitted, via the IP Fabric, to server S2. The VXLAN frame is routed in accordance with standard IP routing mechanisms through the IP fabric until it reaches server S2. In this example, the VXLAN frame may be transmitted to spine switch 3 and spine switch 3 may subsequently route the VXLAN frame to ToR switch 4. Upon receipt of the VXLAN frame, ToR switch 4 may subsequently route the VXLAN frame to server S2. Those skilled in the art will appreciate the outer Ethernet header of the VXLAN frame is rewritten at each hop it traverses in the IP Fabric.

In step 614, the VTEP on the server S2 receives the VXLAN frame from ToR switch 4 and removes the outer header (see e.g., 232 in FIG. 2) to obtain the MAC frame (generated in Step 608). In step 616, the VTEP on server S2 bridges (i.e., sends using the destination MAC address in the MAC frame) the MAC frame to VM B2. VM B2 subsequently processes the MAC frame and extracts the payload.

In one or more embodiments of the invention, unlike the direct overlay routing embodiment, each of the ToR switches in the leaf tier only include routing table entries for a subset of servers and/or virtual machines. However, each of the ToR switches includes routing table entries for each of the other ToR switches, where the routing table entries indicate to which subset of servers and/or virtual machines may be directly routed to by a given ToR switch. The ToR switches share the aforementioned routing information, for example, using interior gateway protocol (IGP). In addition, unlike the direct overlay routing embodiment, the indirect overlay routing embodiment uses a separate layer 2 domain for ToR switch-to-ToR switch communication.

Figure 7:
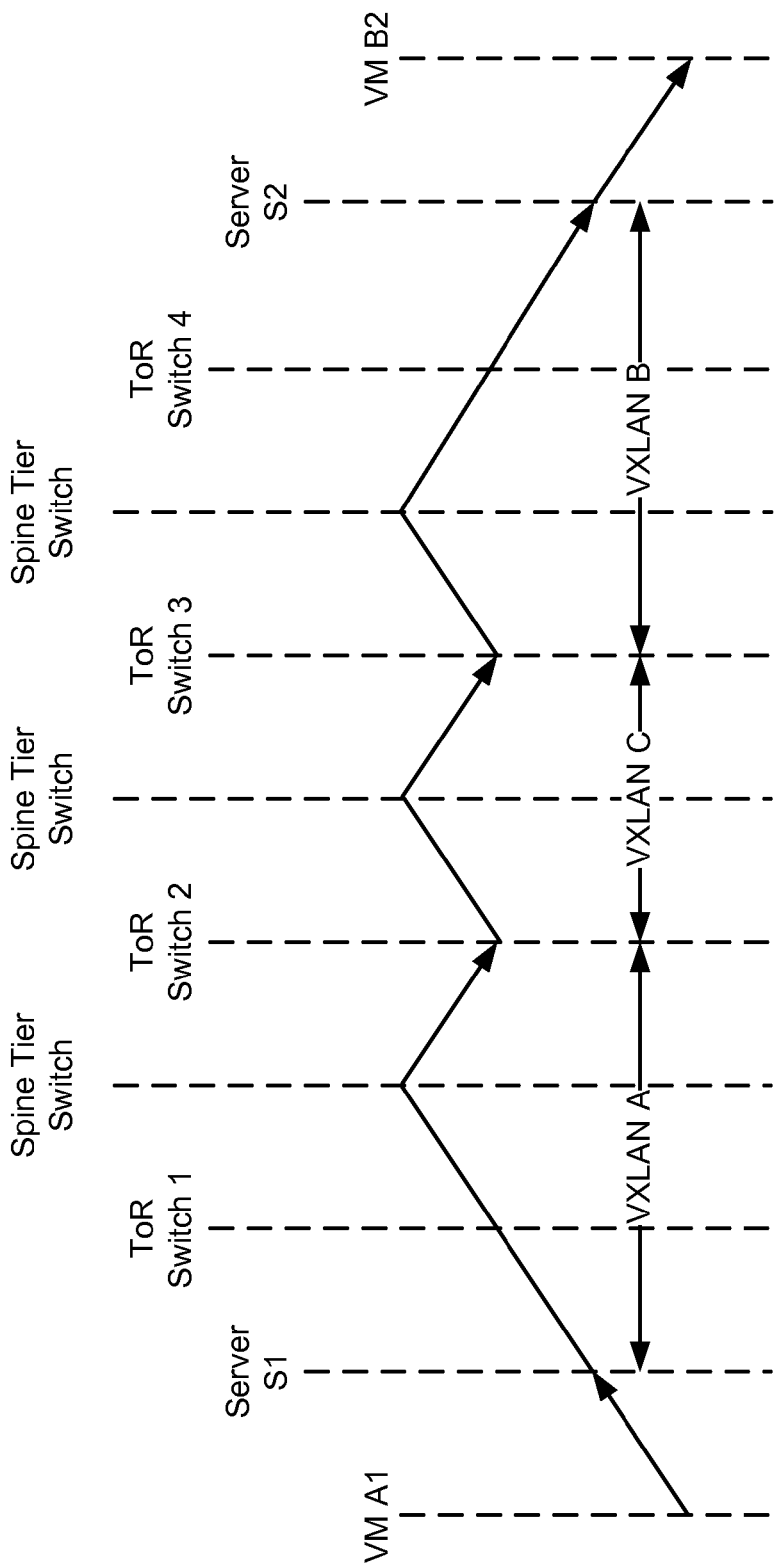
FIG. 7 shows an exemplary path of a payload transmitted using indirect overlay routing in accordance with one or more embodiments of the invention.

FIG. 7 shows an exemplary path of a payload transmitted using indirect overlay routing in accordance with one or more embodiments of the invention. More specifically, FIG. 7 shows an exemplary path the payload from VM A1 may take to reach VM B2. The exemplary path tracks the path described in FIG. 6. The components shown in FIG. 7 correspond to like named components in FIG. 3 and FIG. 6. Turning to FIG. 7, when the initial VXLAN frame (which encapsulated the initial MAC frame including the payload) is routed by server S1 (via ToR Switch 1) to ToR switch 2, the VXLAN frame is transmitted on VXLAN A. The initial VXLAN frame is generated in accordance with FIG. 4A as described above with respect to FIGS. 4A and 6. At ToR switch 2, after the routing of the MAC frame (see Step 602 in FIG. 6), the new resulting MAC frame is encapsulated into a new VXLAN frame and routed to ToR switch 3 (via a spine tier switch). The new VXLAN frame is transmitted on VXLAN C. After receiving the VXLAN frame from ToR switch 2, ToR switch 3 routes the MAC frame (see Step 608 in FIG. 6). The new resulting MAC frame is encapsulated into a new VXLAN frame and transmitted to server S2 on VXLAN B.

Embodiments of the invention enable ToR switch 2 and ToR switch 3 to take a MAC frame received via one VXLAN and transmit the MAC frame (a portion of which is rewritten) and transmit it in via a separate VXLAN. In one embodiment of the invention, this functionality is achieved by first routing the MAC frame and then forwarding the VXLAN frame.

Figure 8:
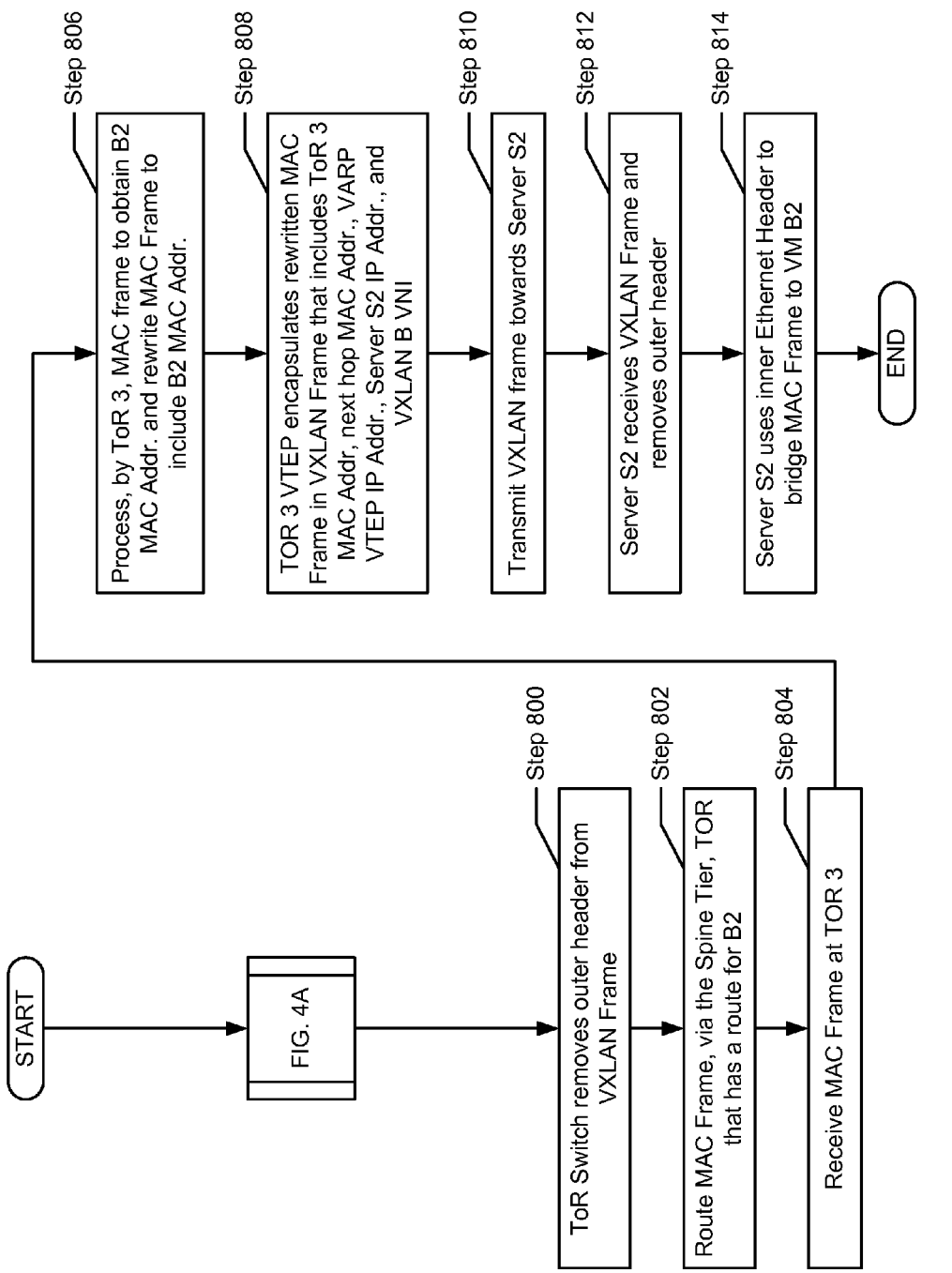
FIG. 8 shows a method for naked overlay routing in accordance with one or more embodiments of the invention.

FIG. 8 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 8 may be performed in parallel with any other steps shown in FIGS. 4A-4B and 6 without departing from the invention.

Turning to FIG. 8, FIG. 8 shows a method for naked overlay routing in accordance with one or more embodiments of the invention. The following discussion of indirect overlay routing is described in relation to the system in FIG. 3; however, embodiments of the invention are not limited to the system shown in FIG. 3.

The method shown in FIG. 8 describes naked overlay routing to enable virtual machine A1 in VXLAN A to communicate with virtual machine B2 on VXLAN B. From the perspective of virtual machine A1, virtual machine A1 is not aware of the VXLAN protocol or of any overlay routing; rather, virtual machine A1 operates as if it can communicate directly with virtual machine B2 using conventional routing mechanisms. The generation of the VXLAN frame that is transmitted from the source server to a ToR switch is performed in accordance with FIG. 4A. However, instead of single VARP MAC address and a single VARP VTEP IP address for all ToR switches, there are multiple VARP MAC addresses and VARP VTEP IP addresses, where different VARP MAC addresses and VARP VTEP IP addresses are used for different layer 2 domains. Accordingly, the specific VARP MAC address and VARP VTEP IP address pair that is present in a given VXLAN Frame may vary based upon the layer 2 domain in which source VM and source server are located. Said another way, because different ToR switches route in in and out of different layer 2 domains of VXLAN, it is essential that the VXLAN frames issued by the source server reach the appropriate ToR Switch (i.e., the ToR switch that has the appropriate routing information). This is enabled by using distinct VARP VTEP IP address and VARP MAC address combinations.

Continuing with the discussion of FIG. 8, in step 800, the VTEP on ToR switch 2 receives the VXLAN frame and removes the outer header (see e.g., 232 in FIG. 2) to obtain the MAC frame. The VXLAN frame received in Step 600 includes a VARP VTEP IP address for VXLAN A and a VARP MAC address for VXLAN A. In one embodiment of the invention, the ToR Switch referenced in step 800 receives, traps, and decapsulates the VXLAN frame because the VXLAN frame includes the ToR MAC address of the ToR Switch as the destination MAC address in the outer Ethernet header and includes the VARP VTEP IP address for VXLAN A as the destination IP address in the outer IP header.

In one embodiment of the invention, prior to the generation of the aforementioned MAC frame, VM A1 is configured to use a VARP VTEP IP address for VXLAN A as the default gateway, which is implemented on ToR switch 2 and other ToR switches thereby providing active-active redundancy. Further, ToR switch ToR switch 2 is associated with a specific VARP MAC address, which in combination with the aforementioned VARP VTEP IP address enables the VXLAN frame transmitted by the source server to reach ToR switch ToR switch 2.

Continuing with the discussion of FIG. 8, in step 802, the MAC frame is routed, via the IP fabric, to a ToR switch from which VM B2 may be reached. For purposes of this explanation, assume VM B2 may be reached via ToR switch 3. Further, assume that the routing table in ToR switch 2 includes a routing table entry specifying a route determined using VM B2 IP address, where the routing table entry indicates that VM B2 is reachable via spine switch 2. Accordingly, the MAC frame received in the VXLAN frame in step 800 is rewritten to remove the VARP MAC address as the destination MAC address and to replace it with the spine switch 2 MAC address. Further, the ToR switch 2 MAC address is included as the source MAC address in the rewritten MAC frame. The rewritten MAC frame is subsequently transmitted to spine switch 2. Spine switch 2, upon receipt of the rewritten MAC frame, performs a routing function using the VM B2 IP address and determines that the next hop is ToR switch 3. Spine switch 2 rewrites the MAC frame it received to remove the Spine switch 2 MAC address as the destination MAC address and to replace it with the ToR switch 3 MAC address. The rewritten MAC frame is subsequently transmitted to ToR switch 3.

Continuing with the discussion of FIG. 8, in step 804, the ToR switch 3 receives the MAC frame from spine switch 2. In Step 806, ToR switch 3 processes the MAC frame in order to obtain a rewritten MAC frame. More specifically, in one embodiment of the invention, ToR switch 3 performs a routing function using the VM B2 IP address in order to obtain the VM B2 MAC address. In one embodiment of the invention, ToR switch 3 includes a routing table, where the routing table includes a routing table entry for VM 2. Accordingly, in the instant example, the MAC frame received in step 804 is rewritten to remove the ToR switch 3 MAC address as the destination MAC address and to replace it with the VM B2 MAC address. Further, the source MAC address in the inner frame is VARP MAC address for VXLAN B.

Continuing with the discussion of FIG. 8, in step 808, the VTEP on ToR switch 3 encapsulates the rewritten MAC frame (obtained in step 806) in a VXLAN frame. More specifically, the VXLAN frame includes an outer header with the following information: a MAC address of ToR switch 3 (as the source MAC address), a MAC address of the next hop (i.e., MAC address of Server S2) (as the destination MAC address), a VARP VTEP IP address for VXLAN B (as the source IP address), an IP address of server S2 (as the destination IP address), and VNI B (i.e., the VNI associated with VXLAN B). The destination IP address in the outer header corresponds to the server that includes the VTEP that will decapsulate the VXLAN frame generated in step 808. The destination server (i.e., server S2) may be determined using the VM B2 IP address. Finally, VNI B is included in the VXLAN frame because VM B2 is associated with VNI B and, as such, VNI B is required to be included for VM B2 to ultimately receive the MAC frame generated in step 808. In one embodiment of the invention, the ToR switch 3 MAC address may be used in place of the VARP MAC address and the ToR switch 3 IP address may be used in place of the VARP VTEP IP address.

Continuing with the discussion on FIG. 8, in step 810, the VXLAN frame generated in step 808, is transmitted, via the IP fabric, to the VTEP on server S2. The VXLAN frame is routed in accordance with standard IP routing mechanisms through the IP fabric until it reaches server S2. In this example, the VXLAN frame may be transmitted to spine switch 2 and spine switch 2 may subsequently transmit the VXLAN frame to ToR switch 4. Upon receipt of the VXLAN frame, ToR switch 4 may subsequently transmit the VXLAN frame to server S2. Those skilled in the art will appreciate the outer Ethernet header of the VXLAN frame is rewritten at hop is traversed in the IP Fabric.

In step 812, the VTEP on the server S2 receives the VXLAN frame from ToR switch 4 and removes the outer header (see e.g., 232 in FIG. 2) to obtain the MAC frame (generated in Step 806). In step 814, the VTEP on server S2 bridges (i.e., sends using the destination MAC address in the MAC frame) the MAC frame to VM B2. VM B2 subsequently processes the MAC frame and extracts the payload.

Naked overlay routing is similar to indirect overlay routing in that the payload from VM A1 traverses the same number of switches in both of the aforementioned embodiments of overlay routing. However, naked overlay routing does not require the additional layer 2 domain from the ToR switches. Instead, naked overlay routing requires the participation of the spine switches, where the spine switches have knowledge (via their routing tables) about which layer 2 domains are accessible by each ToR. In contrast, in the indirect overlay routing embodiment, the spine switches are not aware of which layer 2 domains are accessible by each ToR.

Figure 9:
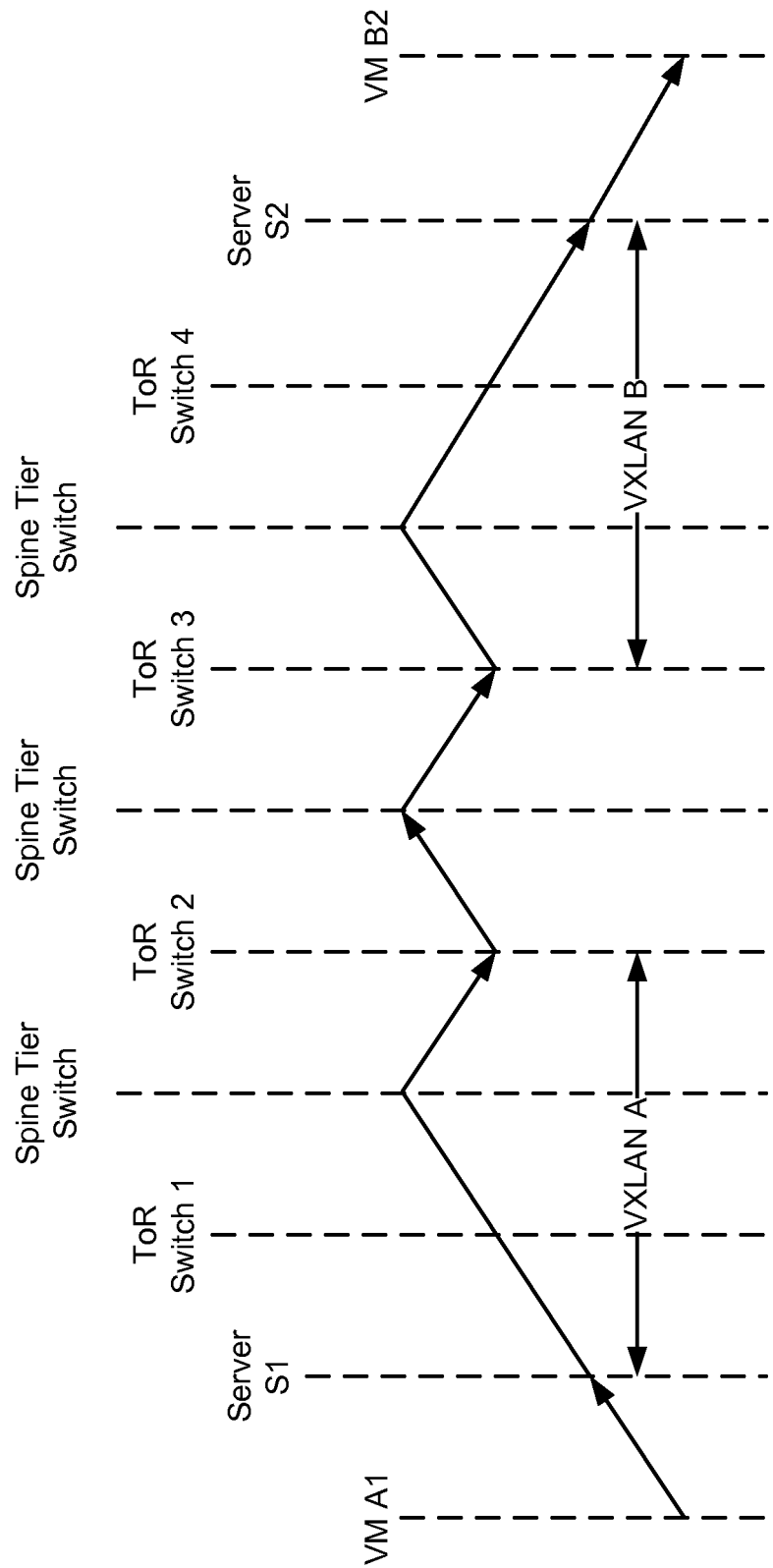
FIG. 9 shows an exemplary path of a payload transmitted using naked overlay routing in accordance with one or more embodiments of the invention.

FIG. 9 shows an exemplary path of a payload transmitted using of naked overlay routing in accordance with one or more embodiments of the invention. More specifically, FIG. 9 shows an exemplary path the payload from VM A1 may take to reach VM B2. The exemplary path tracks the path described in FIG. 8. The components shown in FIG. 9 correspond to like named components in FIG. 3 and FIG. 8. Turning to FIG. 9, when the initial VXLAN frame (which encapsulated the initial MAC frame including the payload) is transmitted by server S1 to ToR switch 2, the VXLAN frame is transmitted on VXLAN A. The initial VXLAN frame is generated in accordance with FIGS. 4A and 8. At ToR switch 2, the MAC frame is routed (without VXLAN) to ToR switch 3 via a spine tier switch. After receiving the MAC frame from the spine tier switch, ToR switch 3 routes the MAC frame (see Step 808 in FIG. 8). The new resulting MAC frame is encapsulated into a new VXLAN frame and transmitted to server S2 on VXLAN B.

Embodiments of the invention enable ToR switch 2 to take a MAC frame received via one VXLAN and transmit the MAC frame (a portion of which is rewritten) and transmit it via a separate VXLAN. In one embodiment of the invention, this functionality is achieved by first routing the MAC frame and then transmitting the VXLAN frame.

In one embodiment of the invention, the network topology may be arranged such that for a given layer 2 domain it may (i) use direct overlay routing to communicate with a first set of other layer 2 domains and (ii) use indirect and/or naked routing to communicate with a second set of layer 2 domains.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing, comprising:
   receiving, by a first Top of Rack (ToR) switch, a first VXLAN frame comprising a first server media access control (MAC) address, a first ToR switch MAC address, a first server Internet Protocol (IP) address, a VARP VTEP IP address, a first VNI, and a MAC frame, wherein the MAC frame comprises a VARP MAC address, a first virtual machine (VM) IP address associated with a first VM, and a second VM IP address associated with a second VM, wherein the first VM is executing on the first server;
   decapsulating, by the first ToR switch, the first VXLAN frame to obtain the MAC frame;
   processing, on the first ToR switch, the MAC frame to obtain a rewritten MAC frame, wherein the rewritten MAC frame comprises a second VM MAC address associated with the second VM and the VARP MAC address;
   generating, by the first ToR switch, a second VXLAN frame comprising the first ToR switch MAC address, a next hop MAC address, a VARP VTEP IP address, a second server IP address, a second VNI, and the rewritten MAC frame, wherein the second server IP address is associated with a second server, and wherein the second VM executes on the second server, wherein the first VM does not execute on the second server; and
   routing the second VXLAN frame through an IP fabric to the second server, wherein the IP Fabric comprises a spine tier comprising a spine switch and a leaf tier comprising the first ToR switch, and a second ToR switch and wherein the second server is connected to the second ToR switch.

2. The method of claim 1, wherein processing the MAC frame comprises executing a routing function to identify a routing table entry using the second VM IP address, wherein the first ToR switch comprises a routing table that includes the routing table entry, wherein the routing table entry indicates that a next hop is the second VM IP address, wherein the second VM MAC address is obtained based on the determination that the next hop is the second VM IP address.

3. The method of claim 1, wherein generating the second VXLAN frame comprises determining the next hop MAC address in the IP fabric, wherein the next hop MAC address is not the second server.

4. The method of claim 3, wherein the next hop MAC address is associated with the spine switch.

5. The method of claim 1, wherein the VARP VTEP IP address and the VARP MAC address are associated with the first ToR switch.

6. The method of claim 1, wherein each switch in the spine tier is directly connected to every switch in the leaf tier, wherein each switch in the spine tier is not directly connected to any other switch in the spine tier.

7. The method of claim 1, wherein the first VM is in a first layer 2 domain and the second VM is in a second layer 2 domain, wherein all VMs in the first layer 2 domain are associated with the first VNI and all VMs in the second layer 2 domain are associated with a second VNI.

8. A method for routing, comprising:
- receiving, by a first Top of Rack (ToR) switch, a first VXLAN frame comprising a first media access control (MAC) address, a first ToR switch MAC address, a first server Internet Protocol (IP) address, a first VARP VTEP IP address, a first VNI, and a MAC frame, wherein the MAC frame comprises a first VARP MAC address, a first virtual machine (VM) IP address associated with the first VM, and a second VM IP address associated with a second VM;
- decapsulating, by the first ToR switch, the first VXLAN frame to obtain the MAC frame;
- processing, on the first ToR switch, the MAC frame to obtain a rewritten MAC frame, wherein the rewritten MAC frame comprises the first ToR switch MAC address and a second MAC address associated with a second ToR switch;
- generating, by the first ToR switch, a second VXLAN frame comprising the first ToR switch MAC address, a first next hop MAC address, a first ToR switch IP address, a second ToR IP address, a second VNI, and the rewritten MAC frame;
- routing the second VXLAN frame through an IP fabric to the second ToR switch, wherein the IP Fabric comprises a spine switch, the first ToR switch, and the second ToR switch;
- receiving, by the second ToR switch, the second VXLAN frame;
- decapsulating, by the second ToR switch, the second VXLAN frame to obtain the rewritten MAC frame;
- processing, on the second ToR switch, the rewritten MAC frame to obtain a second rewritten MAC frame, wherein the second rewritten MAC frame comprises a second VM MAC address and a second VARP MAC address;
- generating, by the second ToR switch, a third VXLAN frame comprising a second ToR switch MAC address, a second next hop MAC address, a second VARP VTEP IP address, a second server IP address, a third VNI, and the second rewritten MAC frame, wherein the second server IP address is associated with the second server, and wherein the second VM does not execute on the second server; and
- routing the third VXLAN frame through the IP fabric to the second server.

9. The method of claim 8, wherein the first ToR switch and the second ToR switch are part of a layer 2 domain that only includes ToR switches.

10. The method of claim 9, wherein each ToR switch in the layer 2 domain is a neighbor of every other ToR in the layer 2 domain.

11. The method of claim 9, wherein all ToR switches in the layer 2 domain exchange routes for the layer 2 domain using interior gateway protocol (IGP).

12. The method of claim 8, wherein the first VM executes on the first server and wherein the first server is not directly connected to the first ToR switch.

13. The method of claim 9, wherein processing the MAC frame comprises executing a routing function to identify a routing table entry using the second VM IP address, wherein the first ToR switch comprises a routing table that includes the routing table entry, wherein the routing table entry indicates that a first next hop is the second ToR switch.

14. The method of claim 13, wherein processing the rewritten MAC frame comprises executing a second routing function to identify a second routing table entry using the second VM IP address, wherein the second ToR switch comprises a routing table that includes the second routing table entry, wherein the second routing table entry indicates that a second next hop is the second VM, wherein the second VM MAC address is obtained based on the determination that the second next hop is the second VM.

15. The method of claim 8, wherein the spine switch comprises a routing table, wherein the routing table does not include any routing table entry that indicates that the second VM is reachable via the second ToR switch.

16. The method of claim 8, wherein the first VARP VTEP IP address is for a first VXLAN, wherein the first VXLAN is associated with the first VNI and the second VARP VTEP IP address is for a second VXLAN, wherein the second VXLAN is associated with the third VNI.

17. A method for routing, comprising:
- receiving, by a first Top of Rack (ToR) switch, a first VXLAN frame comprising a first server media access control (MAC) address, a first ToR switch MAC address, a first server Internet Protocol (IP) address, a first VARP VTEP IP address, a first VNI, and a first MAC frame, wherein the first MAC frame comprises a first VARP MAC address, and an inner IP header, wherein the inner header comprises a first virtual machine (VM) IP address associated with the first VM, and a second VM IP address associated with a second VM;
- decapsulating, by the first ToR switch, the first VXLAN frame to obtain the MAC frame;
- processing, on the first ToR switch, the MAC frame to obtain a second MAC frame, wherein the second MAC frame comprises the first ToR switch MAC address, the inner IP header;
- routing the second MAC frame to the second ToR switch via a spine tier, wherein the second MAC frame is not transmitted using a VXLAN protocol;
- receiving, by the second ToR switch from the spine tier, a third MAC frame comprising the inner IP header;
- processing, on the second ToR switch, the third MAC frame to obtain a fourth MAC frame, wherein the fourth MAC frame comprises a second VM MAC address and a second VARP MAC address;
- generating, by the second ToR, a second VXLAN frame comprising the second ToR switch MAC address, a second next hop MAC address, a second VARP VTEP IP address, a second server IP address, a second VNI, and the second rewritten MAC frame, wherein the second server IP address is associated with a second server and wherein the second VM executes on second server, wherein the first VM does not execute on the second server; and
- routing the second VXLAN frame through a IP fabric towards the second server, wherein the IP fabric comprises the spine tier, the first ToR, and the second ToR switch.

18. The method of claim 17, wherein processing the third MAC frame comprises executing a routing function to identify a routing table entry using the second VM IP address, wherein the second ToR switch comprises a routing table that includes the routing table entry, wherein the routing table entry indicates that a next hop is the second VM IP address, wherein the second VM MAC address is obtained based on the determination that the second next hop is the second VM IP address.

19. The method of claim 17, wherein the spine tier comprises a spine switch, wherein the spine switch comprises a routing table, wherein the routing table comprises a routing table entry that indicates that the second VM is reachable via the second ToR switch.

20. The method of claim 17, wherein the third MAC frame is generated by a spine switch in the spine tier.

* * * * *